United States Patent [19]
Welcker

[11] 3,822,074
[45] July 2, 1974

[54] RELEASABLE COUPLING FOR TUBULAR MEMBERS AND METHOD FOR ASSEMBLYING SAID COUPLING

[76] Inventor: Friedrich Welcker, Im Sonnenwinkel 28, 585 Hohenlimburg, Germany

[22] Filed: Jan. 16, 1973

[21] Appl. No.: 324,542

[30] Foreign Application Priority Data
Jan. 21, 1972 Germany.......................... 2202808

[52] U.S. Cl.................... 285/305, 285/404, 29/526
[51] Int. Cl.............................................. F16l 21/00
[58] Field of Search................... 285/305, 260, 404; 287/53 TK; 151/26; 29/526

[56] References Cited
UNITED STATES PATENTS

| | | | |
|---|---|---|---|
| 2,013,660 | 9/1935 | Lauer................................ | 285/305 |
| 2,597,482 | 5/1952 | Harrison et al.................... | 285/305 |
| 2,688,498 | 9/1954 | Wilson............................... | 285/37 |
| 3,539,205 | 11/1970 | Johnson............................. | 285/260 |

FOREIGN PATENTS OR APPLICATIONS

| | | | |
|---|---|---|---|
| 969,217 | 5/1950 | France.............................. | 151/26 |
| 19,365 | 0/1904 | Great Britain.................... | 285/404 |
| 1,097,192 | 12/1967 | Great Britain.................... | 285/305 |

*Primary Examiner*—Dave W. Arola
*Attorney, Agent, or Firm*—Wolfgang G. Fasse; Willard W. Roberts

[57] ABSTRACT

The present releasable coupling for tubular members includes a female bushing with a bore therethrough and with one or more holes extending through the bushing intermediate its ends, in such a position that the longitudinal axis of the hole extends substantially tangentially and preferably also at right angles to the bore whereby the hole extends partially into the bore. One or two tubular members are inserted as the male element or elements into said bore and a locking pin is then inserted into the respective hole. The locking pin has a conical tip so that the wall of the respective male element is gradually forced inwardly to provide a tight connection. Preferably, the inner end of the male element rests against an inner shoulder in the bore of the bushing.

5 Claims, 6 Drawing Figures

PATENTED JUL 2 1974 3,822,074

RELEASABLE COUPLING FOR TUBULAR MEMBERS AND METHOD FOR ASSEMBLYING SAID COUPLING

BACKGROUND OF THE INVENTION

This invention relates to a releasable coupling for tubular members such as rubber hoses as well as pipes and tubings of various materials. The invention also relates to a method of assemblying the present releasable coupling.

Prior art couplings of this type generally include a cap screw or coupling nut which is rotatably secured to the end of a tubular member by a flange means. When the cap screw is tightened to a threaded male end of another tubular member of any connecting part it presses the flange means against the connecting part whereby usually a gasket or sealing ring is provided inside the cap screw which ring is pressed against the connecting part by the flange means. Another known coupling also employs a cap screw but is more complicated in that the end of the tubular member has a ball shape to fit against a suitable seat in the connecting part. Still another coupling which is limited in its use to securing a flexible hose to a nipple of harder material includes a circular spring with overlapping ring portions and substantially radially outwardly extending ends. The circular spring is snapped into place by pressing the ends together, properly positioning the spring and again releasing the spring ends. This connection is releasable but requires special tongues for the handling of the circular spring which must be made of high alloyed spring steel.

Still another coupling described in German Utility Model 69 34 014 employs a plug coupling including a bushing and a nipple received in the bushing, and a locking bail. The bushing is provided with holes to receive the bail and the nipple is provided with a ring groove to be aligned with the holes for engagement with the bail.

Although this is a relatively simple coupling it still requires the proper alignment of the holes and groove and the machining of the just mentioned elements.

From the foregoing, it will be appreciated that most prior art couplings are still rather expensive to manufacture since, except for the mentioned spring connection, both members to be coupled must be provided with the respective connecting elements which must precisely correspond to each other and which must either include a locking means or an additional locking means must be used. This calls for maintaining relatively high manufacturing standards. Besides, prior art coupling means are not generally suitable for coupling to each other tubular members regardless of the material of which they are made.

OBJECTS OF THE INVENTION

In view of the foregoing it is the aim of the invention to achieve the following objects singly or in combination:

to remove the drawbacks of the prior art, especially to provide a coupling which is releasable and which can be effectively connected again while nevertheless using rather simple elements;

to provide a coupling which is equally useful for connecting tubular members to each other as well as tubular members to any kind of apparatus outlets or inlets and armatures regardless of the type of material out of which these tubular members and outlets, inlets and armatures are made;

to provide a coupling which remains leak-proof and which may be subjected to mechanical loads;

to provide a method for assemblying a coupling in a simple manner and with simple tools; and to provide a coupling wherein a pin is used to provide an axial wedging action.

SUMMARY OF THE INVENTION

According to the invention there is provided a releasable coupling for tubular members including a female bushing with a longitudinal bore therethrough into which one or two tubular members may be inserted. The bushing is provided with at least one cross hole located so that the longitudinal axis of the cross hole extends substantially tangentially relative to the wall of the bore and either perpendicularly or at an angle to a generatrix of said wall of the bore whereby the cross hole extends somewhat into the longitudinal bore. A locking or wedging pin extends through said hole whereby a hose or pipe end inserted into said bore is wedged and held in position in the bore. Preferably the pin is provided with a conical end. The bushing may preferably be provided with an internal shoulder against which the inner end of the tubular member may rest. A sealing washer may be inserted to rest against said shoulder.

According to the invention there is further provided a method for assemblying a releasable coupling for tubular members, comprising providing a bushing having a longitudinal bore and an internal shoulder, with a cross hole which extends somewhat into the longitudinal bore, cutting the end of the tubular member to be inserted into said longitudinal bore of the bushing so that the plane defined by the end opening of the tubular member extends perpendicularly relative to the longitudinal axis of the tubular member, inserting said tubular member into the longitudinal bore of the bushing sufficiently deep past said cross hole and to rest against said internal shoulder, whereby the tubular member is preferably pressed inwardly sufficiently to rest snuggly against said shoulder, and then locking the so established plug connection by inserting a locking pin, preferably a cylindrical locking pin having a conical end, into said cross hole whereby the pin deforms the wall of the tubular member in the area in which its wall reaches into the range of the cross hole. In this manner the tubular member which is inserted into the bushing is nailed so to speak to the bushing and held therein in a sealing manner.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
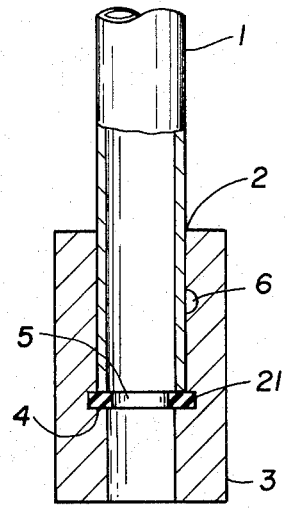
FIG. 1 is a longitudinal section through a coupling according to the invention and showing the hole for the locking pin.

The longitudinal sectional view through a coupling according to the invention as illustrated in FIG. 1 shows the end 1 of a tubular member inserted into the longitudinal bore 2 of a bushing 3. The tubular member 1 may be made of any suitable material, for example metal tubing or it may be formed of flexible material as a hose. The inner end of the tubular member 1 is cut plane which means that the plane defined by the end opening extends at a right angle to the longitudinal axis of the tubular member 1.

The longitudinal bore of the bushing 3 which may also be made of any suitable material, such as hard rubber or metal is provided with an internal shoulder 5 which supports a sealing ring 4 made for example of a softer type of material. The bushing 3 is provided with a cross hole 6, the longitudinal axis of which extends substantially tangentially relative to the wall of the bore 2.

Figure 2:
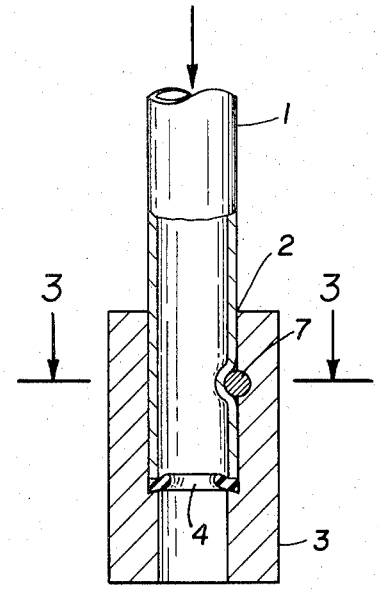
FIG. 2 is a section similar to that of FIG. 1 but also illustrating the inserted locking pin.

The plane end 1 of the tubular member is inserted into the bushing 3 as best seen in FIG. 2, whereby a longitudinal force symbolized by the arrow in FIG. 2 is applied to press the inner end of the tubular member against the sealing ring 4. In this manner a leak tight seal is accomplished between the bushing and the tubular member.

Figure 3:
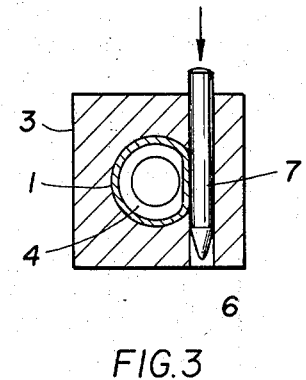
FIG. 3 is a section along the line 3—3 in FIG. 2.

After the insertion of the end of the tubular member into the bushing a cylindrical locking pin 7 is forced into the cross hole 6 preferably while the longitudinal force is still maintained. The locking pin 7 is provided with a conical tip to avoid damage to the tubular member. The cylindrical locking pin 7 deforms the wall of the tubular member in the region of the hole 6 as best seen in FIG. 3, whereby the tubular member is locked in position in the bushing 3 which, for example may have a substantially rectangular cross section as best seen in FIG. 3.

The just described connection may easily be released again by simply withdrawing the locking pin 7 from the hole 6. The establishing of the connection between the tubular member and the coupling and its release may be repeated as often as desired. In this connection, it is not even necessary that the deformed portion of the tubular member 1 is aligned with the hole 6 when the coupling is reestablished.

Figure 5:
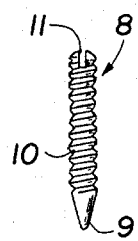
FIG. 5 shows a side view of a modified locking pin provided with an external thread.

FIG. 5 illustrates a modified locking pin 8 also having a conical tip 9 and an external threading 10 as well as a slot 11 for the insertion of a tool such as a screwdriver. For using the locking pin 8 the respective cross hole in the bushing would also be provided with a corresponding threading. Preferably, the threading would have rounded edges so as to avoid cutting into the material of the tubular member, but nevertheless assuring its proper deformation.

Figure 4:
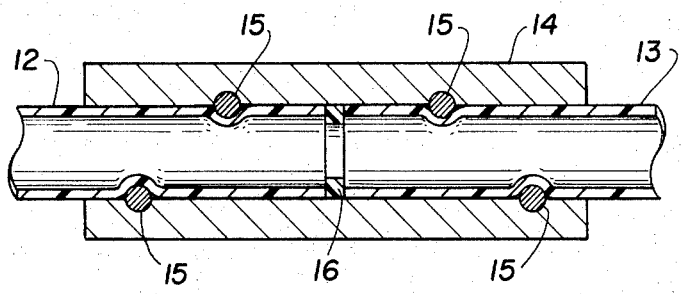
FIG. 4 shows a longitudinal section through a modified embodiment of a coupling according to the invention.

FIG. 4 illustrates a modified embodiment for joining two ends of tubular members 12 and 13 to each other by means of a bushing 14 provided for example with four holes for receiving respective locking pins 15. A sealing ring 16 may be inserted between the ends of the tubular members or these ends may be surrounded by sealing O-rings known as such. It should be mentioned in connection with FIG. 4 that each tubular member could be well secured with but one locking pin 15. However, using two locking pins for each end might be preferable, for example where a garden hose might be subject to longitudinal pull.

Figure 6:
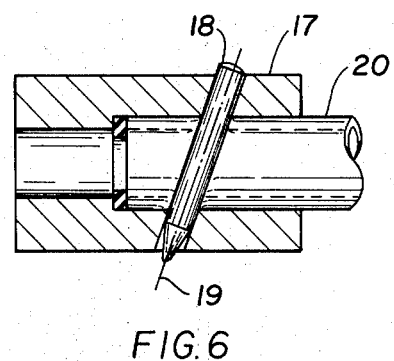
FIG. 6 is a sectional view through a further embodiment of the coupling according to the invention, wherein the locking pin takes up a slanted position.

FIG. 6 shows an embodiment wherein the bushing 17 is provided with holes for the locking pin 18 which are aligned with each other relative to a longitudinal axis 19 which is somewhat slanted relative to the longitudinal axis of the bushing and the tubular member. This embodiment provides an even greater locking force because the area of contact between the locking pin and the deformed portion of the tubular member 20 is even larger due to the slant.

In the light of the foregoing description, it will be appreciated that the producing of the present coupling does not require any complicated or expensive connecting elements. Further, the present coupling may be made in a simple manner by simple means and if necessary even without any tools and the required time is also rather short. It has been found that, although the coupling according to the invention is easily made and just as easily released again, it nevertheless may be subjected to substantial mechanical loads.

The sealing ring 4 is preferably made of silicon rubber and the plane end of the tubular member should be free of burrs. The bushing 3 may be provided with a radial groove 21 for receiving and securing the position of the sealing ring 4. The radial groove 21 will be provided with such dimensions that the sealing ring of silicon rubber or some similar material will be pressed into a sealing position all around the groove by the end of the tubular member inserted into the bushing. In this connection it appears to be unnecessary to maintain the inserting force on the end of the tubular member during the assemblying of the coupling. The radial groove 21 is formed at the time of manufacturing the bushing and the end of the tubular member does not require any machining except perhaps for the above mentioned plane cut.

With regard to providing the cross hole 6 and the locking pin 8 with a threading, it should be noted that such a threading simplifies the insertion and withdrawal of the locking pin. However, in all other respects the cylindrical locking pin and the threaded locking pin operate substantially in the same manner.

Although the invention has been described with reference to specific example embodiments, it is to be understood, that it is intended to cover all modifications and equivalents within the scope of the appended claims.

What is claimed is:

1. A releasable coupling for tubular members comprising a bushing having a longitudinal axis and a longitudinal bore therethrough for inserting an end of a tubular member, stop means located in said bushing, a cross hole through said bushing, said cross hole extending partially into the space of said longitudinal bore, said cross hole having a respective longitudinal axis which extends substantially tangentially relative to the wall of said longitudinal bore in the bushing and at an angle relative to a generatrix of the wall of said longitudinal bore of the bushing whereby said longitudinal axis of the cross hole is slanting toward said stop means, and a locking pin inserted into said cross hole, said locking pin wedging said end of said tubular member in the direction of said longitudinal axis of the bushing to press said end axially against said stop means, said locking pin deforming said tubular member in the range of said cross hole.

2. The coupling according to claim 1, wherein a sealing means is located in said bushing between said stop means and said end of the tubular member.

3. The coupling according to claim 1, wherein said cross hole and said locking pin each comprise a respective thread, said locking pin having a conical tip at one end thereof and means for applying a tool to the other end of the locking pin.

4. The coupling according to claim 1, wherein said stop means comprise an end of a second tubular member inserted and secured in said bushing.

5. A method for assemblying a coupling for tubular members including a bushing with a longitudinal bore therethrough, with an internal shoulder in said bore and with a slanted cross hole extending through the bushing and partially into the longitudinal bore, comprising providing the end of the tubular member to be inserted into said longitudinal bore, with a plane, smooth cut extending perpendicularly to the longitudinal axis of the tubular member, inserting said end of the tubular member into said longitudinal bore with a sufficient axially directed force so that said end rests firmly against said internal shoulder, locking said axially directed force by wedging a locking pin into said slanted cross hole, said wedging providing an axially directed force component for said locking and a further force component for deforming the wall portion of said tubular member in the range of the cross hole, said axially directed force component being directed toward said shoulder.

* * * * *